(12) United States Patent
Reed et al.

(10) Patent No.: US 11,732,842 B2
(45) Date of Patent: Aug. 22, 2023

(54) LUBRICATION UNIT MANAGEMENT SYSTEM

(71) Applicant: DUALCO, INC., Houston, TX (US)

(72) Inventors: D. L. Whitney Reed, Houston, TX (US); Michael Ulanoff, Houston, TX (US); Israel Rodriguez, Houston, TX (US); Brian K. Reed, Houston, TX (US)

(73) Assignee: DUALCO, INC., Houston, TX (US)

( * ) Notice: Subject to any disclaimer, the term of this patent is extended or adjusted under 35 U.S.C. 154(b) by 0 days.

(21) Appl. No.: 16/521,469

(22) Filed: Jul. 24, 2019

(65) Prior Publication Data

US 2020/0032956 A1    Jan. 30, 2020

Related U.S. Application Data

(60) Provisional application No. 62/702,763, filed on Jul. 24, 2018.

(51) Int. Cl.
| | |
|---|---|
| *G06F 3/14* | (2006.01) |
| *G05B 19/05* | (2006.01) |
| *G05B 19/43* | (2006.01) |
| *F16N 29/02* | (2006.01) |
| *G06F 3/04847* | (2022.01) |
| *F16N 7/38* | (2006.01) |
| *G06F 3/04886* | (2022.01) |
| *G06F 3/0482* | (2013.01) |

(52) U.S. Cl.
CPC ............. *F16N 7/38* (2013.01); *F16N 29/02* (2013.01); *G05B 19/05* (2013.01); *G05B 19/43* (2013.01); *G06F 3/14* (2013.01); *F16N 2270/70* (2013.01); *G06F 3/0482* (2013.01); *G06F 3/04847* (2013.01); *G06F 3/04886* (2013.01)

(58) Field of Classification Search
CPC ........ F16N 7/38; F16N 29/02; F16N 2270/70; F16N 2250/04; F16N 13/16; G05B 19/43; G05B 19/05; G06F 3/14; G06F 3/04847; G06F 3/04886; G06F 3/0482
See application file for complete search history.

(56) References Cited

U.S. PATENT DOCUMENTS

| | | | | |
|---|---|---|---|---|
| 6,123,174 | A * | 9/2000 | Elkin ................. | F01M 11/0458 |
| | | | | 123/196 S |
| 8,534,120 | B1 * | 9/2013 | Pavlik ................ | G01M 3/3263 |
| | | | | 73/49.2 |
| 10,459,675 | B2 * | 10/2019 | Hashem ............ | G05B 19/4145 |

(Continued)

FOREIGN PATENT DOCUMENTS

CN          202371423        *   8/2012   ............. F16N 29/00

OTHER PUBLICATIONS

US Nuclear Regulatory Commission, Motor Operated Valves Course Manual, 2011, section 2.3.4, retrieved from the internet URL<: https://www.nrc.gov/docs/ML1134/ML11343A642.html>, URL<: https://www.nrc.gov/docs/ML1134/ML11346A634.pdf> (Year: 2011).*

*Primary Examiner* — Kenneth M Lo
*Assistant Examiner* — Jonathan Michael Skrzycki
(74) *Attorney, Agent, or Firm* — Alexander B. Uber; Gray Reed

(57) ABSTRACT

A system for remotely controlling and documenting valve lubrication. The system includes an operator unit programmed to communicate with a remote controller unit that actuates the transfer of lubricant to user-selected valves.

20 Claims, 8 Drawing Sheets

(56) References Cited

U.S. PATENT DOCUMENTS

| | | | |
|---|---|---|---|
| 2005/0199312 A1* | 9/2005 | Wiens | G07F 13/025 |
| | | | 141/94 |
| 2006/0289237 A1* | 12/2006 | Beauchamp | F01M 9/02 |
| | | | 184/6.3 |
| 2013/0277148 A1* | 10/2013 | Beck | F16N 29/02 |
| | | | 184/6.4 |
| 2016/0330225 A1* | 11/2016 | Kroyzer | H04L 63/1425 |
| 2019/0392076 A1* | 12/2019 | Dhakshinamoorthy | |
| | | | G06F 16/3344 |
| 2020/0063719 A1* | 2/2020 | Madsen | F03D 17/00 |

* cited by examiner

LUBRICATION UNIT MANAGEMENT SYSTEM

CITATION TO PRIOR APPLICATIONS

The present application claims priority to U.S. Provisional Application No. 62/702,763, titled "LUBRICATION UNIT MANAGEMENT SYSTEM" and filed Jul. 24, 2018.

FIELD OF THE INVENTION

The present invention relates generally to systems for the remote lubrication of valves.

BACKGROUND OF THE INVENTION

Traditional methods for valve lubrication involve manual control of lubricant flow to valves. This manual approach; however, can often result in improper lubrication that leads to valve/bearing failure requiring increased expenditures for maintenance and valve replacement. Prior art approaches to valve lubrication also typically result in insufficient, real-time lubrication documentation.

In addition to these concerns, prior art methods also involve high levels of energy consumption, lubricant consumption, equipment downtime, operating expenses, and waste relative to the automated systems and methods of the present invention.

Furthermore, prior art methods are hampered by the practical considerations of time and available personnel as these constraints often render such methods ineffective at keeping up with the greasing requirements of larger systems. Accordingly, industrial operations, utilizing these prior art methods, would have to be halted in order to ensure proper equipment maintenance.

Additionally, reliance on manual lubrication also puts human operators at risk when attempting to access difficult-to-reach points or valves that may be located over or under machinery.

BRIEF DESCRIPTION OF THE DRAWINGS

All illustrations of the drawings are for the purpose of describing selected versions of the present invention and are not intended to limit the scope of the present invention.

DETAILED DESCRIPTION OF EMBODIMENTS OF THE INVENTION

The present invention provides an effective solution to the growing need for adequate and verifiable lubrication and documentation thereof. Through use of, in certain embodiments, a supervisory control and data acquisition ("SCADA") system, efficient remote valve lubrication and record generation is achieved. Rather than rely on manual production of records that may not accurately reflect actual levels of lubrication, embodiments of the present invention are configured to record lubrication data tied to connected sensors in real-time during each lubrication operation.

Figure 1:
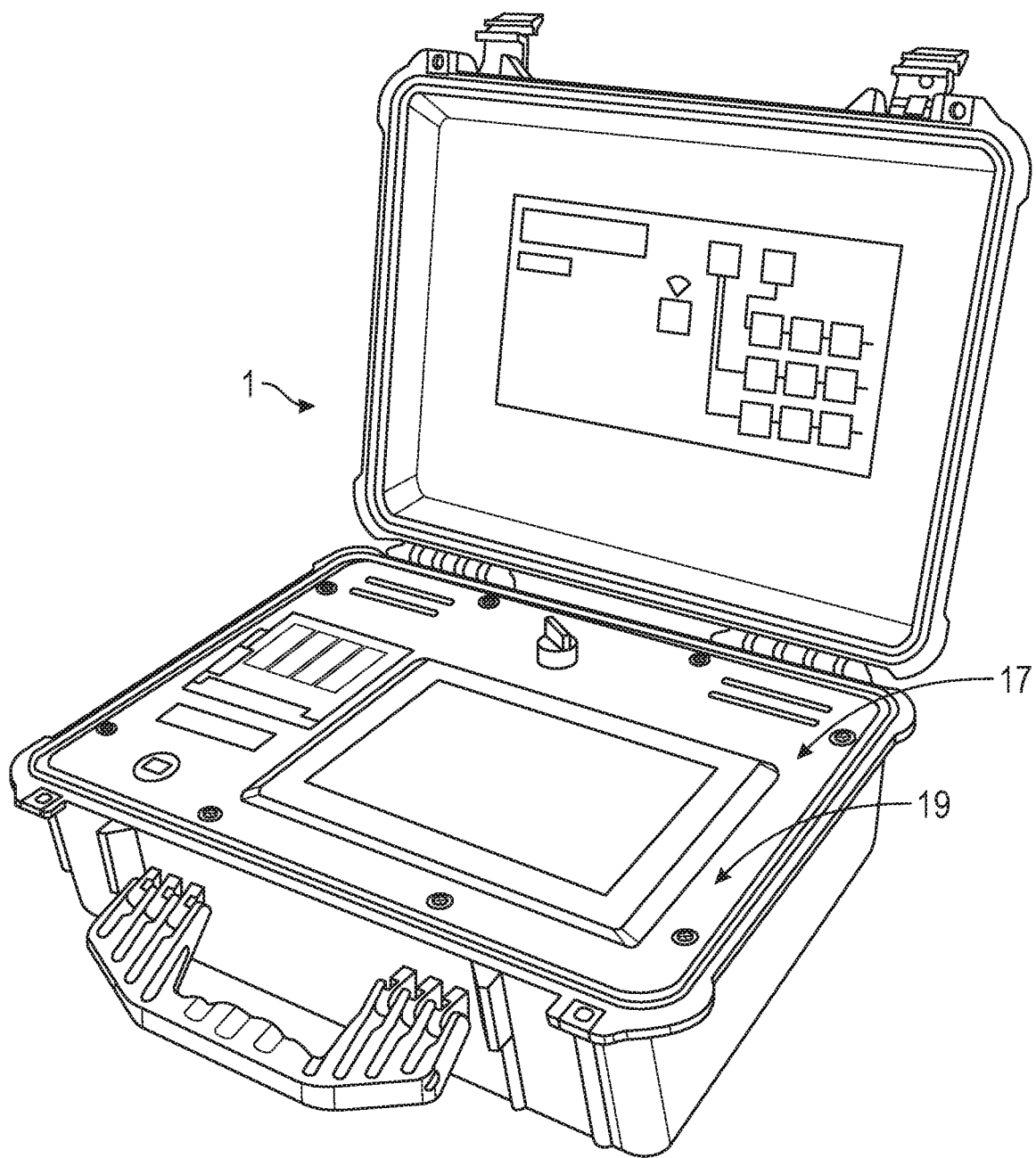
FIG. 1 is a perspective view of one embodiment of an operator unit.
Figure 2:
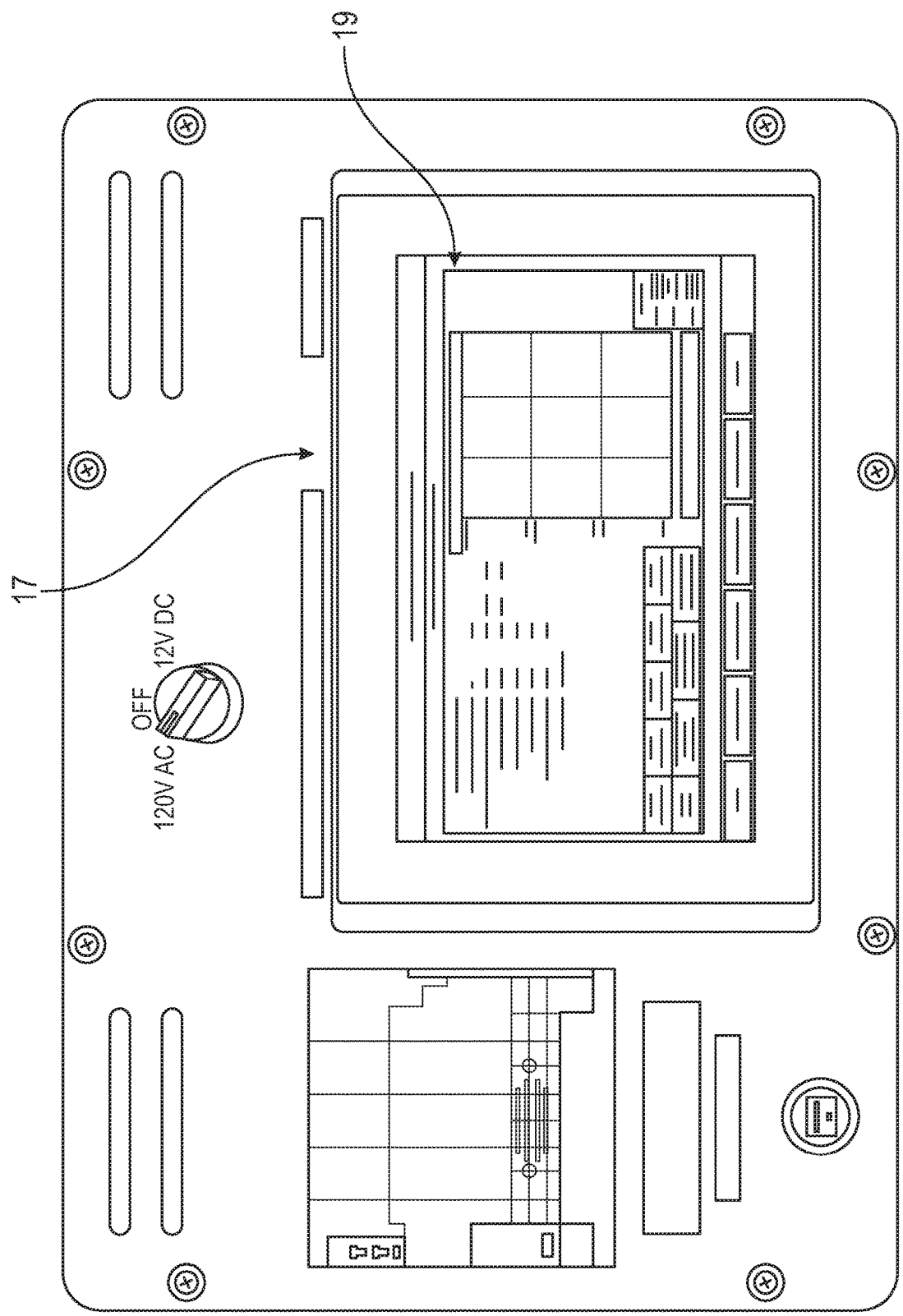
FIG. 2 is a top view of one embodiment of an operator unit.
Figure 3:
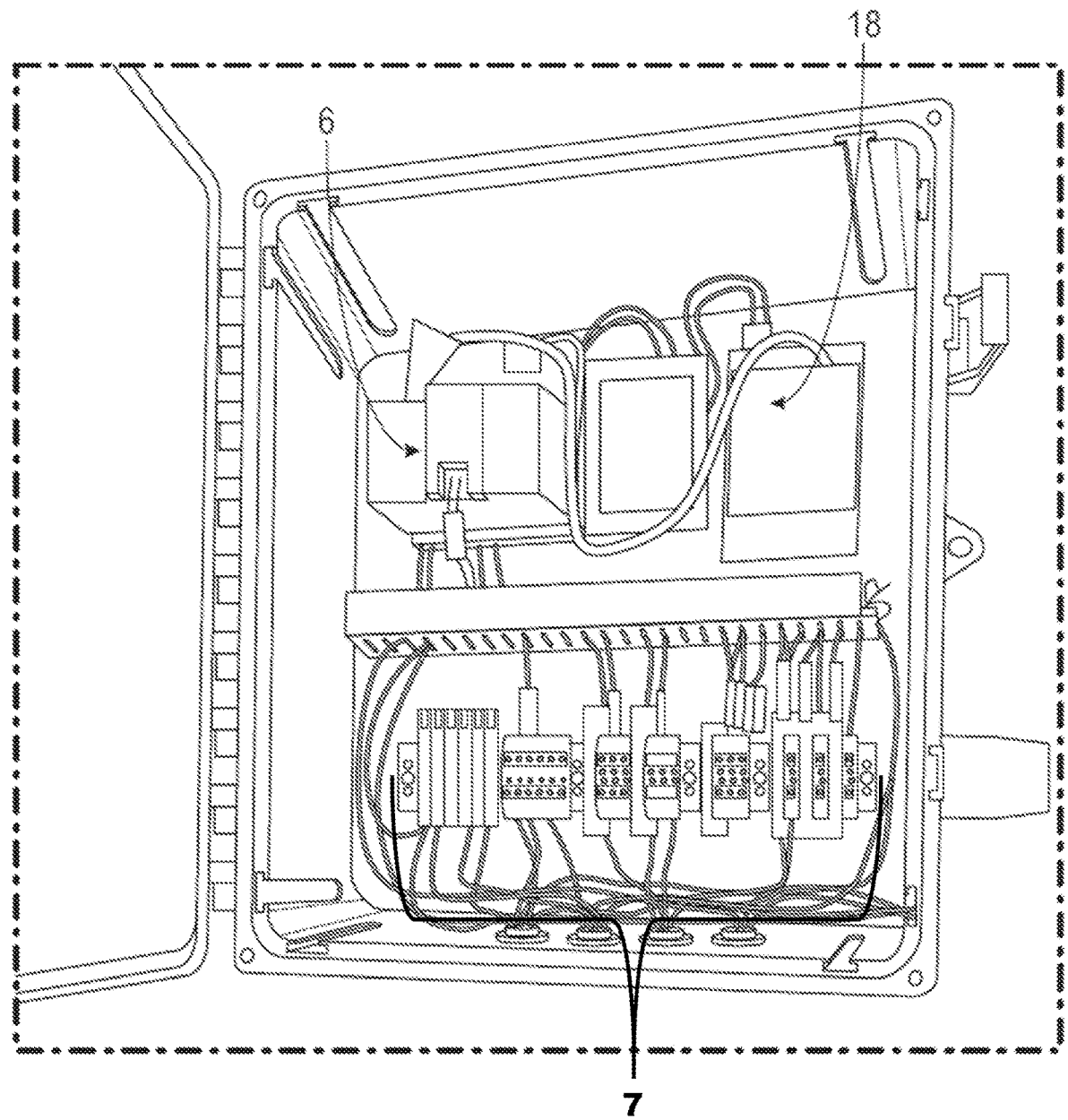
FIG. 3 is a top perspective view of one embodiment of a remote controller unit.
Figure 4:
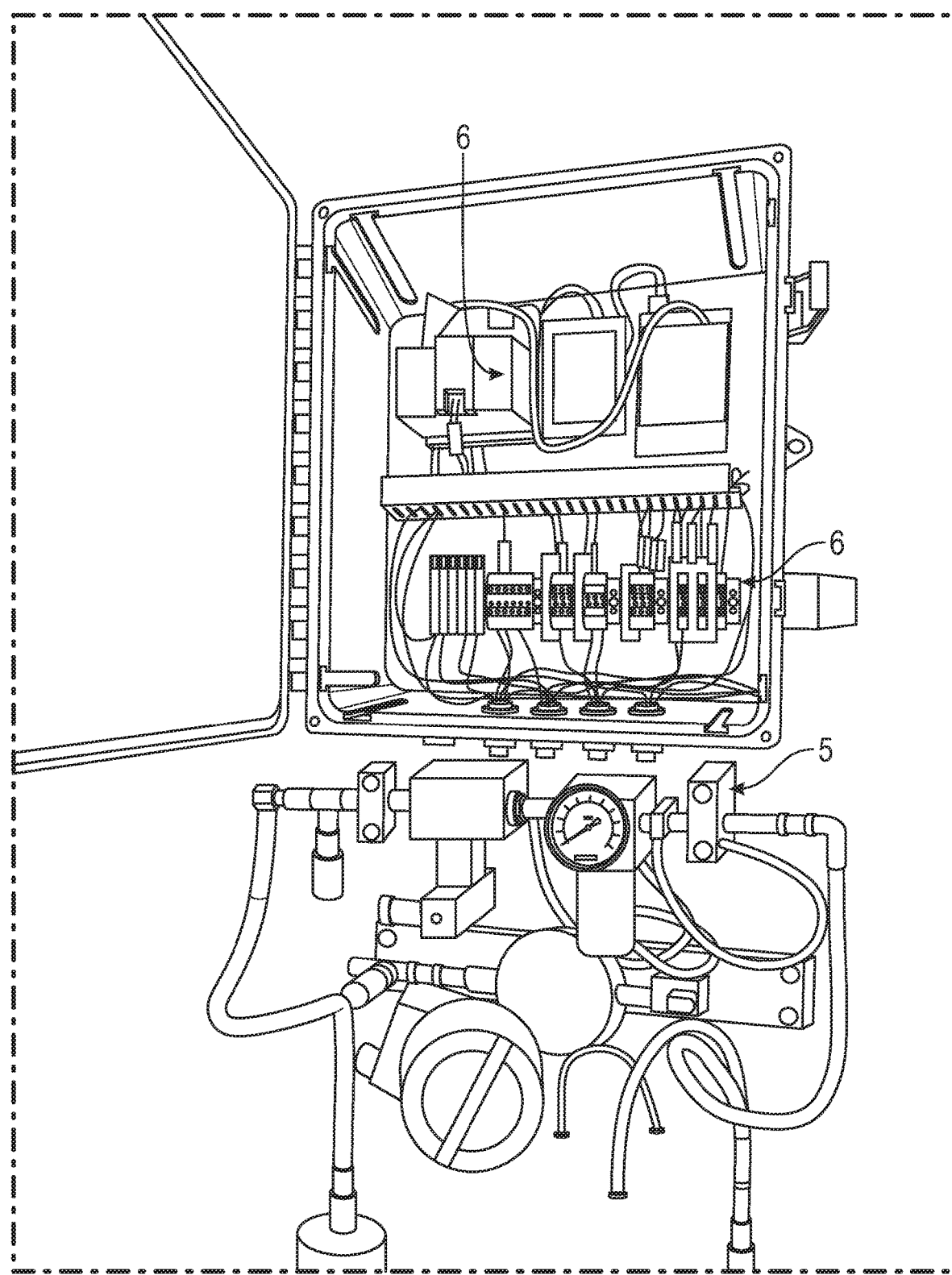
FIG. 4 is a top perspective view of a sensor assembly and coupled PLC in one embodiment of a remote controller unit.
Figure 5:
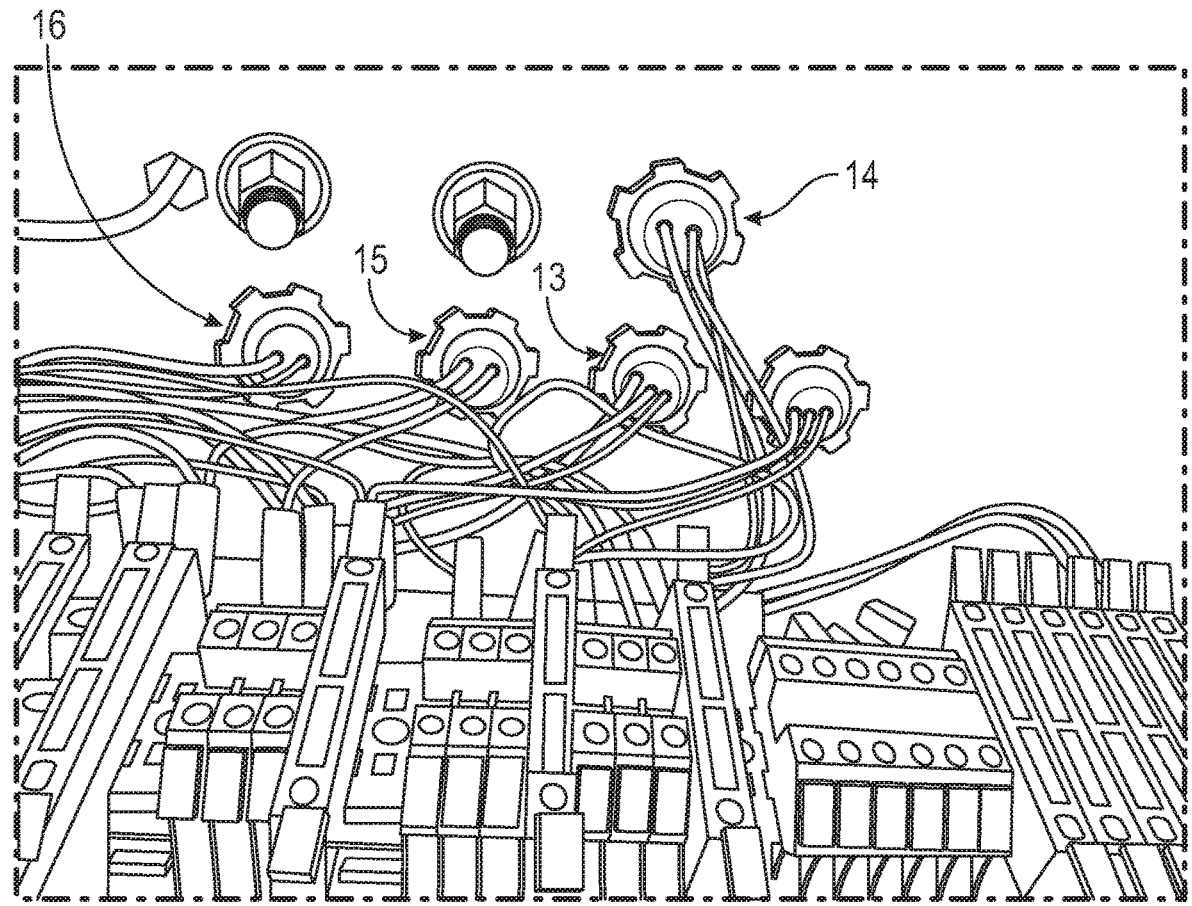
FIG. 5 is a sectional view of one embodiment of a remote controller unit.
Figure 6:
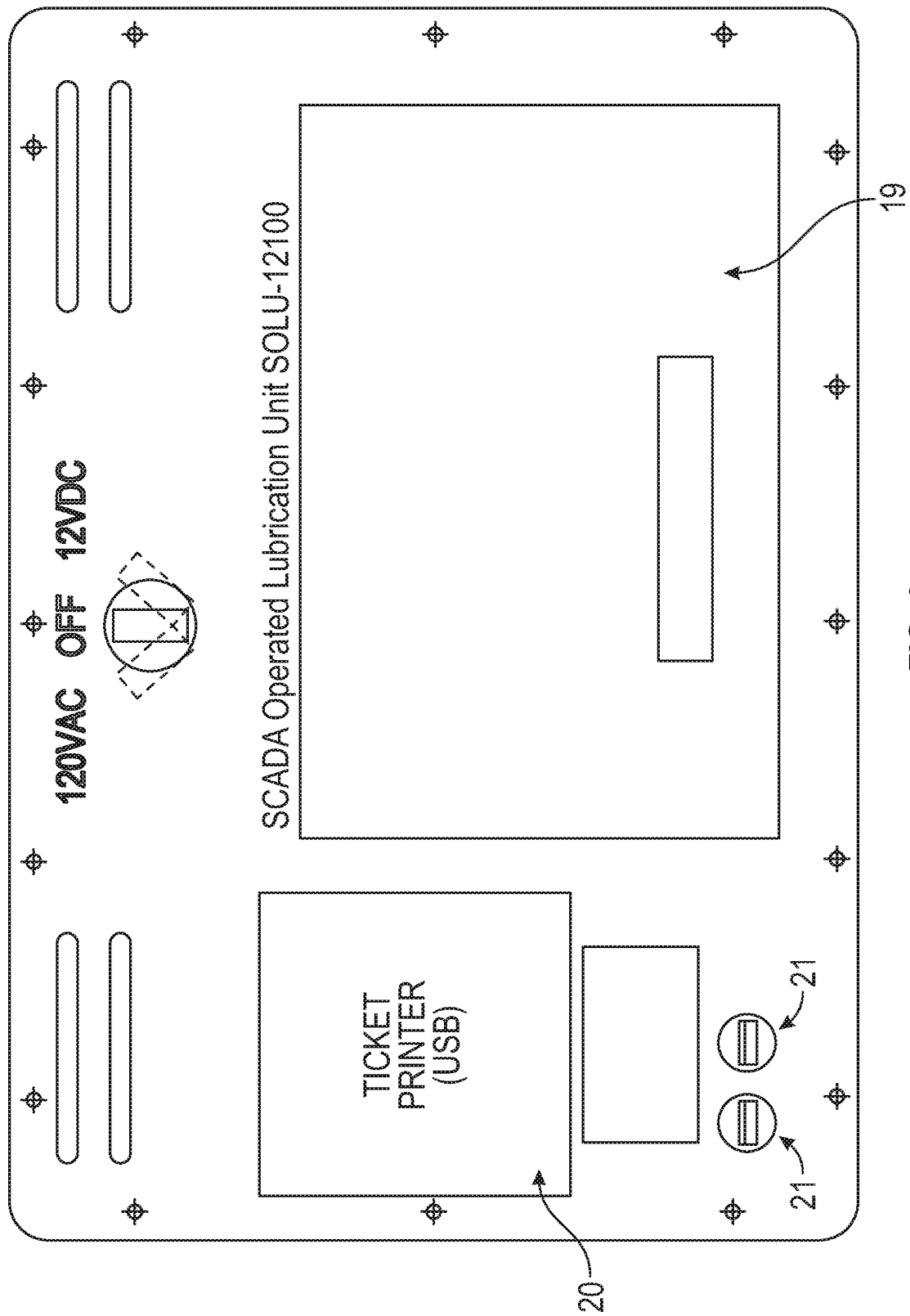
FIG. 6 is a top diagrammatic view of one embodiment of an operator unit.
Figure 7:
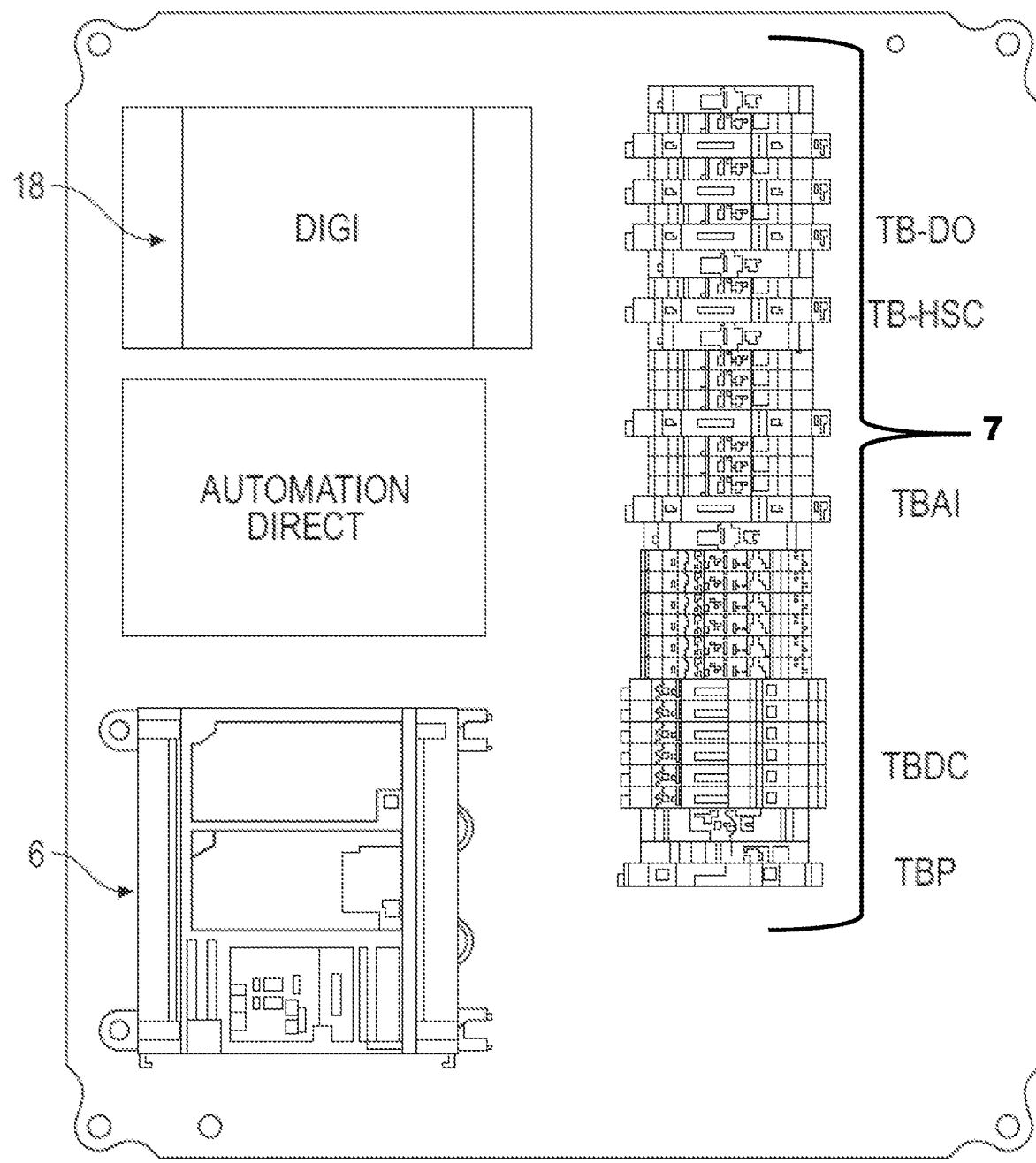
FIG. 7 is a top diagrammatic view of one embodiment of a remote controller unit.
Figure 8:
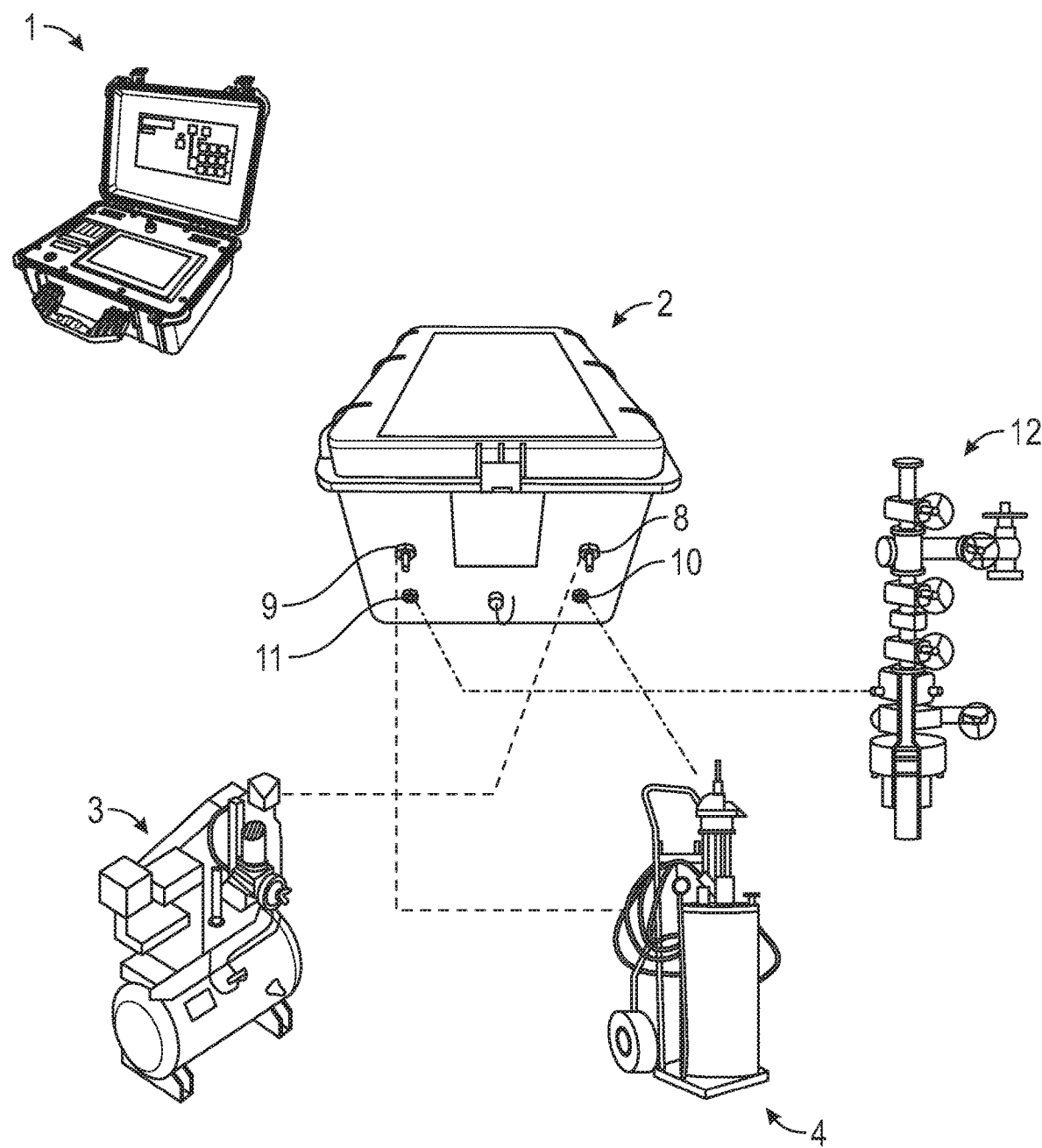
FIG. 8 is a diagram of interactions between components in one embodiment of the present invention.

In reference to FIGS. 1-8, certain embodiments of the present invention relate to a lubrication unit management system that consists of four primary components: a remote controller unit 2, an operator unit 1, an air supply unit 3, and a lubricant supply unit 4.

The remote controller unit is self-contained and couples a sensor assembly 5 (utilizing several sensors described below) with a programmable logic controller ("PLC") control panel 6 to allow for measurement and regulation of both air and lubricant flow through the system. Specifically, the sensor assembly includes an air pressure transmitter, an air-operated pump solenoid valve, a lubricant pressure transmitter, and a lubricant flow transmitter each of which is coupled to the PLC. The remote controller unit may be contained in a sturdy, movable housing in some embodiments composed of a hard polymer material. The various components of the sensor assembly may be wired to PLC terminal blocks 7 using quick-disconnect type terminals.

The remote controller unit may be configured to be powered by the charger port inside a vehicle such as car or truck. Additionally, it is designed to operate using 12 VDC incoming power, but it can also be powered from a wall-mounted 120 VAC receptacle though this would require the use of a 120 VAC-to-12 VDC power adapter.

The lubricant flow transmitter is a flow rate sensor and coupled to a positive displacement flow meter. The lubricant flow transmitter is configured to send an analog signal representative of lubricant flow through the sensor assembly to the PLC. The lubricant pressure transmitter can be any commercially available pressure sensor capable of communicating (typically through an analog signal) with the PLC. The lubricant pressure transmitter is configured to send an analog signal representative of lubricant pressure in the sensor assembly to the PLC.

Similarly, the air pressure transmitter may be any commercially available sensor capable of communicating (typically through an analog signal) with the PLC. The air pressure transmitter is configured to send an analog signal representative of air pressure in the sensor assembly to the PLC. The air-operated pump solenoid valve may be any commercially available solenoid valve that is capable of actuation by the PLC via electrical current output—24 VDC in certain embodiments.

In certain embodiments, the air supply unit is coupled to the remote controller unit via an air supply input connector 8 that feeds into the solenoid valve. When actuated, the solenoid valve allows air to flow through the system via a hose or tube that is coupled to the air pressure transmitter and ultimately terminates in an air supply output connector 9. The PLC may activate/deactivate the solenoid valve based on air pressure measurements received from the air pressure transmitter. The air supply output connector is coupled to the lubricant supply unit to allow for airflow to the lubricant supply unit when the solenoid valve is actuated thereby causing lubricant to flow toward the remote controller unit.

The lubricant supply is further coupled to remote controller unit via a lubricant supply input connector 10 that feeds into the positive displacement flow meter. As lubricant is pumped from the lubricant supply unit into the lubricant supply input connector and into the positive displacement flow meter, the flow is measured by lubricant flow transmitter. Lubricant continues to flow through the positive displacement flow meter into a hose or tube coupled to lubricant pressure transmitter and ultimately through a lubricant supply output connector 11. The PLC may activate/deactivate the solenoid valve based on lubricant pressure measurements received from the lubricant pressure transmitter or on lubricant flow measurements received from the lubricant flow transmitter. As lubricant flows, the PLC keeps track of total volume (derived from flow rate and flow time) to ensure the target quantity of lubrication is achieved. The lubricant supply output connector is ultimately coupled to the relevant valve(s) 12 and allows lubricant to be pumped to said valve(s).

In certain embodiments, air pressure transmitter cables 13, lubricant pressure transmitter cables 14, and lubricant flow transmitter cables 15 provide wired communication with the PLC. The lubricant flow transmitter transmits its analog signal to the PLC in pulses for high-speed counting.

PLC-control of the solenoid valve is achieved through communication between the remote controller unit and the operator unit. In some embodiments, solenoid valve cables 16 provides wired communication with the PLC. The operator unit comprises a touchscreen panel computer 17 that serves as a human-machine interface (HMI) and is running SCADA software. Communication between the remote controller unit and operator unit may be achieved through radio signal transmission via radio modems 18 in both units. The operator unit is designed to be powered using two different voltage sources—120 VAC and 12 VDC. The 12 VDC power can be drawn from the charger port inside a vehicle such as a car or truck. The 120 VAC power can be derived from a wall-mounted 120 VAC receptacle. A 3-position selector switch may be included for power-supply selection. The operator unit may also be configured to include and be powered by a rechargeable battery.

The operator unit may be programmed to effectuate remote lubrication of user-selected valves that comports with O.E.M. lubrication requirements and to record data related to such lubrication operations.

The operator unit touchscreen panel computer may include a display 19 that is configured to present PLC clock seconds that are constantly updated while there is communication between the operator unit and remote controller unit. The display may also be configured to display navigation buttons that allow users to move between application screens.

In certain embodiments a lubricant injection button is also displayed and is used to begin a lubrication operation. When this button is pressed and a lubrication operation begun, the user may be prompted to enter operation-specific data (customer name, well name, service order number, etc.). Upon submission of this operation-specific data (or after starting the operation in embodiments where no such data is requested), the user will be prompted to enter valve information (part number, serial number, valve manufacturer, etc.). The user will be further prompted to select valve type (such as API 6A, 6C, and 6D valves).

As needed for the type of valve selected, a pop-up menu may appear prompting the user to select further valve-specific information (model type, size, working pressure, actuation type, etc.). Additionally, certain valve types may also prompt the user to select the position of the valve from a valve tree diagram. The selected valve on the tree diagram may change color to allow the user to visually identify that the correct valve has been selected. In the case that valve position information is requested, the user will be prompted to confirm the position selection before the operation continues.

When valve type (and position where relevant) have been selected, the user may press a calculate button that will determine that amount of lubricant to apply. In the event that an incompatible combination of valve type and position has been selected, pressing the calculate button may be configured to return instructions to modify the selected data rather than calculate lubricant quantity. If all data entered is valid and compatible, a save button may be pressed after the calculation to save all data to a database. A confirmation message box may display to confirm successful database entry.

A start injection button may be displayed and pressed to then initiate lubrication of the selected valve. Once pressed, the operator unit will cause the PLC in the remote controller unit to actuate the solenoid valve to begin lubrication. The display may be configured to present live readings of air pressure, lubricant pressure, and lubricant quantity during the lubrication operation. These readings may optionally be presented on a graph that depicts trends in real-time.

A status indicator may be displayed during the lubrication operation to indicate current operational progress. This indicator may include the following display messages:

"Running" when the lubrication operation is in progress with the solenoid valve energized. The readings described above will be constantly measured by the PLC and fed to the operator unit while the operation is in this state.

"Paused" when the user elects to temporarily halt the operation or after an active shutdown event has been cleared. A resume button may be pressed to continue operations that have been paused.

"Shutdown" if certain active shutdown events have occurred. In the event of a shutdown, the indicator may further display the specific active shutdown event that triggered the shutdown.

"Aborted" when a user elects to permanently halt an operation prior to completion.

"Complete" when the calculated amount of lubricant has been directed to the selected valve.

As discussed above, a lubrication operation may be halted if an active shutdown event is encountered. When an active shutdown event halts an operation, the solenoid valve is de-energized. Such events may include:

Exceeded lubricant pressure threshold. A lubricant pressure threshold may be set that will trigger a shutdown if reached. The operator unit may be programmed to shut down a lubrication operation in which lubricant pressure is more than 1,000 psi over the user-selected working pressure.

Insufficient air pressure. A required air pressure threshold may be set that will trigger a shutdown if not maintained. The operator unit may be programmed to shut down a lubrication operation in which air pressure falls below 60 psi. Additionally, an intermediate threshold may be set at 70 psi that causes a low air pressure indicator to activate when air pressure falls below said intermediate threshold for more than five (5) seconds. Unless air pressure falls below the require air pressure threshold, the operation will not be shut down.

Insufficient lubricant flow. A lubricant transfer quantity threshold may be set that will trigger a shutdown if not reached. The operator unit may be programmed to shut down a lubrication operation if the total quantity of lubricant injected over a one (1) minute duration is less than 0.05 ounces. Low lubricant flow may be indicated on the display during this event.

After an active shutdown event halts a lubrication operation, the user must first clear the event by using a global reset button. After the reset, the operation is considered paused. Hitting the resume button will allow the operation to continue.

A stop operation button may be displayed and pressed during an operation to halt said operation. When pressed, the user will be prompted to confirm the action.

The operator unit may also be configured to accept user-entered comments that relate to a lubrication operation or any events (user-generated or otherwise) that occurred during an operation.

After a valve has been lubricated, the user will be asked if more valves require lubrication. If the user selects yes, the operation continues and valve selection process begins again. If the user selects no, the operator unit begins generating an operation report and returns to a default display screen.

An override button may also be displayed and pressed to allow a user to alter the solenoid valve's energized state. If the solenoid valve is de-energized, pressing the override button will cause it to become energized and vice versa. This button will likely be used to prefill a line with lubricant prior to the commencement of a lubrication operation.

In the event that the remote controller unit is disconnected from the operator unit or is otherwise unpowered, the operator unit may be configured to enter a simulation mode. A communication status indicator may be displayed on the operator unit display to signal whether or not active communication with the remote controller unit is occurring.

During simulation mode, the user may interact with the operator unit as described above to run a simulated lubrication operation. During such operations, lubricant flow is simulated a predetermined rates (for example, 0.25 lbs./s for 6A valves, 0.25 oz./s for 6C and 6D valves). Once the simulated calculated lubricant quantity has been reached, the simulated operation stops normally and indicates "Complete."

The operator unit may be further programmed to simulate active shutdown events when in simulation mode. In such cases, the user may select from a list of active shutdown events to observe how the operator unit handles these events. Prior to starting a simulated operation, the user may select an active shutdown event. The operator unit may alter simulated air pressure, lubricant pressure, and lubricant flow rate to simulate the relevant active shutdown event.

Regarding the operator unit's calculation of lubricant quantity to be applied to a valve, as described above, the quantity is derived from the valve information input into the operator unit by the user. In certain embodiments, once all relevant information has been entered, the operator unit pulls a preset lubricant quantity value from a data table stored in memory that corresponds to the user-entered valve data. This data table is populated by valve lubricant quantity values known in the art. The operator unit simply queries the table with the valve data to retrieve the correct lubricant quantity. This value then becomes one of the setpoints (specifically related to lubricant flow over time as measured by lubricant flow transmitter (FT200)) that will cause the solenoid valve (SV100) to be closed when said setpoint is reached thereby signaling completion of target valve lubrication.

As discussed previously, the operator unit may be configured to generate operation reports and related data in real-time. The operator unit may be further configured to store these reports and data. For example, the volume of lubricant used, pump stroke, and volume rate is measured and relayed to the operator unit to ensure O.E.M. valve requirements are met. These measurements may be stored in operator unit memory along with particular well, pipeline, and/or valve details. The operator unit may also include a printer 20 that may be used to print selected data. The operator unit may also have external media ports 21 that allow transfer of collected data to external devices including USB drives.

Other remote observational and control devices may be coupled to the lubrication unit management system via Bluetooth, radio, or other known technologies for wireless communication. Additionally, an application may be run on smartphones and tablets that allows for remote access and control of the lubrication unit management system. The application may include all functionality of the operator unit programming as previously described. Additionally, in some embodiments, smartphones or tablets running the application may act as an operator unit and be in direct communication with the remote controller unit.

In some embodiments the lubrication unit management system is rated at 15,000 psi and configured to measure the flow of lubrication or sealants with an NLGI consistency of 4.

In other embodiments, the control software could be integrated into the remote controller unit relying on the remote controller unit only as a user-input terminal and display.

In certain embodiments, the operator unit may include scanning means to read codes or other scannable identifiers (such as RFID and UPC codes) to facilitate data or information entry.

Although the invention has been explained in relation to various embodiments thereof, it is to be understood that many other possible modifications and variations can be made without departing from the spirit and scope of the invention.

The invention claimed is:

1. A lubrication unit management system comprising:
a portable operator unit, wherein said portable operator unit comprises a computer having a display;
a movable remote controller unit contained in a portable housing element, said movable remote controller unit being configured for wireless communication with said portable operator unit, the movable remote controller unit comprising:
a programmable logic controller (PLC) arranged within said portable housing element, and
a sensor assembly operationally coupled to said PLC, the sensor assembly comprising a solenoid valve, a lubricant flow transmitter, and an air pressure transmitter;
an air supply unit operationally coupled to the solenoid valve of said movable remote controller unit via an air supply input connector;
a lubricant supply unit operationally coupled to the air pressure transmitter of said movable remote controller unit via an air supply output connector and the sensor assembly of said movable remote controller unit via a lubricant supply input connector; and
one or more valves coupled to the sensor assembly of said movable remote controller unit via a lubricant supply output connector,
wherein the computer of the portable operator unit comprises valve information comprising valve types stored in a memory of the computer, wherein the portable operator unit is configured to calculate a target lubricant quantity to be applied to a valve based on the valve information of a user-selected valve and a user-selected valve position, and wherein the portable operator unit is configured to return instructions to modify the user-selected valve and user-selected valve position if an incompatible valvetype and position have been selected, wherein the PLC is configured to control the solenoid valve to cause air to flow from the air supply unit to the lubricant supply unit to dispense the target lubricant quantity to the one or more valves, wherein said PLC measures readings from said sensor assembly, said PLC sends said readings to said portable operator unit, and said portable operator unit shows said readings on said display, such that said readings are measured and displayed in real-time.

2. The lubrication unit management system of claim 1 wherein said movable remote controller unit is configured to operate when powered from direct current and alternating current.

3. The lubrication unit management system of claim 2 wherein said sensor assembly further comprises a lubricant pressure transmitter.

4. The lubrication unit management system of claim 3 wherein said readings comprise sensor data from said air pressure transmitter, said lubricant pressure transmitter, and said lubricant pressure transmitter.

5. The lubrication unit management system of claim 4 wherein said operator unit is configured to simulate a lubrication operation based on the user-selected valve information.

6. The lubrication unit management system of claim 5 wherein said valve information further comprises valve size, valve working pressure, and valve actuation type.

7. The lubrication unit management system of claim 3 wherein said PLC is configured to present PLC clock seconds to the display of the portable operator unit, wherein the PLC clock seconds are continuously updated while there is communication between the portable operator unit and the movable remote controller unit.

8. The lubrication unit management system of claim 7 wherein said readings comprises air pressure measurements, lubricant pressure measurements, and lubricant flow measurements.

9. The lubrication unit management system of claim 4 wherein said portable operator unit is configured to generate an operation report after the lubricant supply unit has dispensed the target quantity of lubricant.

10. An operator unit apparatus comprising:
a computer comprising a memory;
valve information stored in the memory, the valve information comprising valve part numbers, valve serial numbers, valve manufacturers, valve model types, valve size, valve working pressure, and valve actuation type;
valve data stored in a data table in the memory comprising preset lubricant quantity values corresponding to the valve information that comport with original equipment manufacturer (O.E.M.) requirements;
a touch screen panel comprising a display;
a radio modem configured to communicate with a remote controller configured to lubricate one or more coupled valves;
a rechargeable battery;
wherein the operator unit is configured to:
prompt a user to enter the valve information and a valve position for a lubrication operation;
return instructions to modify the user-entered valve information if the user-entered valve information is incompatible with the user-entered valve position;
query the valve data in the data table with the user-entered valve information to receive a corresponding preset lubricant quantity;
effectuate remote lubrication of user-selected valvesthat comport with O.E.M. lubrication requirements via the remote controller; and
present air pressure, lubricant pressure, and lubricant quantity readings generated from the remote controller.

11. The apparatus of claim 10 wherein the operator unit is further configured to present PLC clock seconds of a PLC of the remote controller unit-on the display.

12. The apparatus of claim 10 wherein the operator unit is further configured to run a simulated lubrication operation, wherein the operator unit displays simulated air pressure, lubricant pressure, and lubricant quantity readings based on the valve data of user-selected valves.

13. The apparatus of claim 12 wherein the operator unit is further configured to run a user-selected active shutdown event simulated operation, wherein the operator unit alters simulated air pressure, lubricant pressure, and lubricant quantity readings based on the user-selected active shutdown event.

14. The apparatus of claim 10 wherein the operator unit is configured to record data for lubrication operations, wherein the recorded data comprises volume of lubricant used, pump stroke rate, lubricant volume rate, well details, pipeline details, and valve details.

15. The apparatus of claim 14 wherein the operator unit is configured to print the recorded data.

16. An operator unit apparatus comprising:
a portable housing;
a computer comprising a memory;
valve information stored in the memory, the valve information comprising valve part numbers, valve serial numbers, valve manufacturers, and valve types;
valve data stored in a data table in the memory comprising preset lubricant quantity values corresponding to the valve information that comport with original equipment manufacturer (O.E.M.) requirements and predetermined lubricant flow rates corresponding to the valve information for running a simulated lubrication operation;
a display;
wherein the operator unit is configured to:
communicate with a remote controller configured to lubricate one or more coupled valves;
query the valve data in the data table with user-entered valve information to receive a corresponding preset lubricant quantity;
effectuate remote lubrication of user-selected valves that comport with O.E.M. lubrication requirements via the remote controller;
present air pressure, lubricant pressure, and lubricant quantity readings generated from the remote controller;
halt remote lubrication of user-selected valves upon encountering an active shutdown event, wherein the active shutdown events comprise exceeding a lubricant pressure threshold, insufficient air pressure, and insufficient lubricant flow;

run a simulated lubrication operation,
  wherein the operator unit presents simulated air pressure, lubricant pressure, and lubricant quantity readings based on the valve data; and
run a simulated active shutdown event,
  wherein a user selects an active shutdown event to simulate,
  wherein the operator unit presents simulated air pressure, lubricant pressure, and lubricant quantity readings based on the valve data and the selected active shutdown event.

17. The apparatus of claim 16, wherein the lubricant pressure threshold active shutdown event occurs when lubricant pressure is more than 1,000 psi over a user-selected working pressure.

18. The apparatus of claim 16, wherein the insufficient air pressure active shutdown event occurs when air pressure falls below 60 psi.

19. The apparatus of claim 16, wherein the insufficient lubricant flow active shutdown event occurs when the total quantity of lubricant injected over a one-minute duration is less than 0.05 ounces.

20. The apparatus of claim 16, wherein the valve data further comprises valve model type, working pressure, actuation type, and valve position.

* * * * *